United States Patent [19]

Udvardy et al.

[11] 4,424,300

[45] Jan. 3, 1984

[54] POWDERED PHENOL-FORMALDEHYDE RESIN

[75] Inventors: Otto G. Udvardy, West Hill; Patricia E. Titus; Martin Navratil, both of Scarborough, all of Canada

[73] Assignee: Borden, Inc., Columbus, Ohio

[21] Appl. No.: 427,858

[22] Filed: Sep. 29, 1982

[30] Foreign Application Priority Data

Dec. 7, 1981 [CA] Canada .................................. 391657

[51] Int. Cl.³ ............................................. C08L 61/10
[52] U.S. Cl. .................................... 525/501; 525/934; 528/165; 264/13
[58] Field of Search ................. 525/501, 934; 528/165; 264/13

[56] References Cited

U.S. PATENT DOCUMENTS

| | | | |
|---|---|---|---|
| 2,101,635 | 12/1937 | Bender | 523/342 |
| 2,976,574 | 3/1961 | Keutgen et al. | 528/502 |
| 4,098,770 | 7/1978 | Berchem et al. | 528/140 |

*Primary Examiner*—Theodore E. Pertilla
*Attorney, Agent, or Firm*—George P. Maskas; Kenneth P. Van Wyck; Daniel D. Mast

[57] ABSTRACT

Phenol-formaldehyde resin powder capable of both heat softening and fast-cure is produced by spray drying a blend of resole and novolac prepolymers. The powder, when mixed, heated and pressed with wax-coated wood chips, flows and cures to form a superior, bonded flake waferboard.

12 Claims, No Drawings

POWDERED PHENOL-FORMALDEHYDE RESIN

BACKGROUND OF THE INVENTION

In the manufacture of exterior grade plywood and particleboard, phenol-formaldehyde (phenolic) resin is conventionally used as the glue or binder. Phenolic resins are used because they have a resistance to exposure at least equal to that of wood itself.

"Composition Board" and its manufacture is fully disclosed in the Encyclopedia of Polymer Science and Technology by Mark and Gaylord, Volume 4 (Collagen to Dialysis). As set forth in that publication, a wet process for making hardboard was developed and used first. After the development of synthetic resins (urea formaldehyde, phenol-formaldhyde) as wood adhesives, a dry process for manufacturing hardboard was developed. The wet process involved forming a slurry of wood fiber, collection of the fiber upon a screen or other forming surface, and removal of the water. In the dry process, the fiber is handled as an air dispersion which may be formed into a mat by a sifting technique. A thermosetting resin is applied to the fibers (as by spraying) before they are formed into a mat. Then the mat is pressed at high pressures and temperatures into the form of a board having the desired density.

Phenolic resins, either as a liquid or as a powder, have been combined with wood particles in producing particleboard in the past. Many forms of wood particles have been used in making particleboard, i.e., chips, shavings, flakes, splinters, saw dust, sander dust and mixtures of these have been used.

Presently, exterior grade plywood and particleboards are produced using phenol-formaldehyde (PF) resin as the binder. Resins for these applications are almost exclusively liquid resoles with formaldehyde to phenol mole ratios of 1.5/1 to 2.8/1, total resin solids of 40-45% and including from 5-10% by weight of NaOH based on liquid resin.

Recently, a new composition board, which is similar to particle board and known as waferboard, has gained a share of the market for exterior grade construction panels. Due to the physical configuration of the flakes of wood used in making waferboard the application of powdered resin binder has been proven more successful.

Powdered phenol-formaldehyde resins have been used for years as foundry sand binders for making shell molds and for injection molding. These resins are novolacs which are acid catalyzed resins that can be cured to the infusible, insoluble thermoset condition by reaction with a suitable hardening agent such as hexamethylenetetramine (hexa). Novolacs are heat-softenable and are curable only in the presence of a formaldehyde donor such as para-form or hexa. Although novolac resins can be produced in powdered form, they have the disadvantage of requiring expensive equipment and high energy input for their production and they have a slow rate of cure. Novolac resins are usually referred to as two-stage resins.

Resoles can be spray dried to form a powder. However, since powdered resoles are not heat softenable, they generally have been used to form reconstituted liquid resins and not as a binder for wood particles.

Resole phenolic resins are produced under highly alkaline conditions and are relatively high in formaldehyde. They cure or cross-link when heated because sufficient formaldehyde is present to form a cross-linked structure. Thus, they are considered to be one-stage resins. Unlike the novolac resins in solid form, the resole resins do not melt or soften upon being heated. For this reason, resoles have very limited use in powder form.

PRIOR ART

Although phenol-formaldehyde resin powders have been in existence, as stated above, the need for a one-stage, powdered phenolic resin with melting or heat-softening characteristics arose with the development of waferboard.

The Berchem et al. U.S. Pat. No. 4,098,770 describes a method of making PF powder of the one-stage type by spray drying the resole solution. The powder is said to have long storage life and is redispersible in water to form reconstituted liquid resins. These solid resins made with a non-phenolic polyhydroxy compound, which is added thereto before spray drying, are used to make a wafer-board. The non-phenolic polyhydroxy compound must be considered to be a diluent that does not contribute toward adhesion.

Keutgen et al., U.S. Pat. No. 2,976,574, describes a process of making an abrasive structure, such as a grinding wheel, by mixing aluminum oxide abrasive grain with a liquid resole phenolic resin and then mixing the resin-wetted grains with novolak resin microspheres. The latter mixture is cold molded into test bars under a pressure of 1,000 to 10,000 psi and the bars are then baked at elevated temperatures to cure the resin.

SUMMARY OF THE INVENTION

The present invention relates to an improved phenol-formaldehyde resin, in the form of a powder, that exhibits both heat-softening and fast cure properties. This phenolic resin powder is especially suited for use as a binder for wood flakes that are pressed into a waferboard.

More specifically, a prepolymer is made of a novolac resin, a prepolymer is made of a resole resin, and these prepolymers are mixed in liquid form to make a homogeneous blend which is spray dried to produce powdered resin.

The liquid mixture is a dark, transparent, solution that is spray dried to form a light tan-colored powder. The powder has a long storage life and a fast curing time. It softens at a temperature less than 90° C. Because the resin heat softens and because it cures fast, these resin powders are excellent binders for wood flakes made into waferboards.

It is an object of this invention to provide a powdered phenolic resin binder for waferboard that heat softens, fast cures, and is not too expensive to produce.

It is also an object to provide a method of making the binder that does not require a high temperature kettle nor the high energy input normally associated with the production of novolac resins.

These objects are attained by making the combined novolac-resole resin described briefly above, the production of which will now be set forth in more detail.

Other objects will become apparent from the following description.

DETAILED DESCRIPTION

In making the novolac and resole resins, standard manufacturing conditions and reactants are used. The phenol may be pure or technical grade phenol or may include cresol with para and meta-cresol content. The preferred phenol is one with not more than 15% by weight ortho-cresol plus xylenols. The formaldehyde may be any commercially available form containing 37%, 50%, or 100% aldehyde. An aqueous solution of formaldehyde is preferred.

The basic catalyst can be an alkali hydroxide or an alkaline earth oxide or hydroxide. The preferred catalyst is sodium hydroxide.

Acids for the novolac may be any acid that gives a sufficiently low pH and the desired degree of methylolation of phenol. The preferred acids are sulfuric, hydrochloric, oxalic or acetic acid. Metal oxides such as those of lead or zinc may be used to induce a higher degree of ortho linkages. When used, the metal oxide may or may not be removed from the novolac or from the blend of the novolac and resole prepolymers.

The resole prepolymer is formed in a conventional manner at an elevated temperature and under highly alkaline conditions and is then cooled to room temperature. Any method that produces a solution of phenol-formaldehyde resin condensed to a "B" stage is satisfactory.

The resole resin is formed by reacting together in an aqueous medium, phenol and formaldehyde in a ratio of one mole of phenol to between 2.0 and 3.3 moles of formaldehyde in the presence of between 0.25 and 0.6 mole of a basic catalyst. One mole of phenol to between 2.6 and 2.7 moles of formaldehyde and between 0.38 to 0.4 mole of basic catalyst is preferred.

The novolac prepolymer is prepared in a conventional manner with acid catalysis and at an elevated temperature. The resin is formed by reacting together in an aqueous medium, phenol and formaldehyde in a ratio of one mole of phenol to between 0.7 and 0.9 mole of formaldehyde in the presence of an acid catalyst. The preferred ratio is one mole of phenol to between 0.8 and 0.85 mole of formaldehyde. The reaction is allowed to advance in the manner known in the art until two phases are formed in the reaction mixture and then it is cooled to 65°–70° C. before mixing it with the resole resin described earlier.

The two liquid prepolymers are mixed together to form a homogeneous, dark, transparent solution. The resole prepolymer can be pumped into the reactor containing the freshly prepared novolac or, preferably, the two prepolymers are blended in a separate storage tank equipped with an agitator.

The blend is preferably cooled to room temperature and then spray dried to form a light tan powdered product. It is possible to spray dry the resin mixture as soon as the 20°–25° C. resole is blended with the 60°–65° C. novolac or at any intermediate temperature as the blend cools down to room temperature.

In spray drying, the liquid feed is converted to a fine spray; the water in the feed is evaporated by means of a stream of hot air; and the dry, powdered product is separated from the stream of hot air. Moisture evaporation is controlled by control of the inlet and outlet temperature of the hot air used for drying. Due to the thermosetting nature of the product, it is preferred that the outlet temperature is from about 60°–70° C. Variables such as droplet size, air flow rate, air temperature and humidity affect the moisture content of the powdered product. The particle size, which varies with the degree of atomization and amount of solids in the liquid feed, should preferably be from 50–90 microns, with no particles larger than 90 microns. A spinning disc atomizer is preferably used.

The resulting powdered resin has a long storage life and a fast curing time. It softens at from 85°–100° C. and preferably at 90° C., or less. It has a hot plate cure of from 10–25 seconds, preferably 15 seconds, at 150° platen temperature.

In addition to being perfectly suited for use in producing waferboard, the powdered resin has other advantages. Its production does not require the use of a high temperature kettle normally associated with the production of novolac resins and therefore its production requires less energy. The resin powder flows and binds the wood flakes but does not stick to the metal platens when the waferboard is pressed. The crushing of the novolac resin to a fine powder and blending it with formaldehyde donors, in accordance with previous practice, has been eliminated. Since the resin powder contains no additives that do not contribute to adhesion, the resin powder is more efficient as a binder than previous binders that had polyhydroxy compounds added to obtain heat-softening characteristics. The present powdered resin when blended with fillers is suitable for use as a molding compound. Although the powdered resins disclosed above are especially suited for use in waferboard production, they also may be used as a binder for foundry sand or in any application where a fast-curing, heat-softenable powdered resin is needed.

Examples that illustrate the invention follow.

EXAMPLE 1

| Resole precursor | |
| --- | --- |
| Phenol | 1 mole |
| Formaldehyde (50% sol.) | 2.60 moles |
| Sodium hydroxide (50% sol.) | 0.40 mole |
| Water | To make about 50% total solids |

The phenol, formaldehyde and one-half the base needed were heated in a reactor vessel with agitation to a temperature of 90° C. The remaining sodium hydroxide is incrementally added and the mixture further reacted to a viscosity end point of 70–150 cps at 80° C. The prepolymer is then cooled to 20°–25° C.

| Novolac precursor | |
| --- | --- |
| Phenol | 1 mole |
| Formaldehyde (50% sol.) | 0.85 mole |
| Oxalic acid | 0.04 mole |
| ZnO | 0.02 mole |
| Water | To make about 50% total solids |

These ingredients were charged in a reactor vessel and the resins prepared in a conventional way by heating them at reflux 1.5–2 hours and then cooling to 65°–70° C.

The resole resin is then poured into the novolac resin in the reactor and mixed therewith until a uniform solution is obtained.

The proportion, by volume, of the two precursors may be from about 40:60 to 60:40.

The mixture is cooled to 20°–25° C. and is then ready for spray drying.

EXAMPLE 2

| Resole precursor | |
|---|---|
| Phenol | 1 mole |
| Formaldehyde (50% sol.) | 2.20 moles |
| Sodium hydroxide (50% sol.) | 0.40 mole |
| Water | To make about 50% total solids |

The process to make the resin prepolymer is the same as in Ex. 1.

| Novolac precursor | |
|---|---|
| Phenol | 1 mole |
| Formaldehyde (50% sol.) | 0.85 mole |
| Oxalic acid | 0.02 mole |
| Water | To make about 50% total solids |

The process to make the resin prepolymer is the same as Ex. 1.

The resin mixture is prepared and dried as in Ex. 1.

EXAMPLE 3

The powdered resins of Example 1 and 2 were then used to make waferboards.

Aspen flakes with a thickness of 0.025-0.030 inches, a length along the grain of about 1.5 inches, a width across the grain of 0.75-1.5 inches and a moisture content of 4.5-5.5% were used. The flakes were sprayed with molten slack wax while they were tumbled in a rotating blender. The wax was applied at a rate of 2% based on the oven dry weight of the flakes. The powdered resin of Example 1 was then sprinkled onto the treated flakes at a rate of 2.5% based on the oven dry weight of the flakes and tumbled for 2-3 minutes. Waferboard was made by pressing these treated flakes in a conventional manner to produce a board having a density of 42 pounds per cubic foot and a thickness of 0.5 inch. Likewise, a board was produced using the powdered resin of Example 2. The internal bond strength and modulus of rupture properties of the waferboards so produced were as follows:

| | | Ex. 1 | Ex. 2 |
|---|---|---|---|
| IB (psi) | | 66.2 | 64.8 |
| MOR (psi) | | 4250 | 3900 |
| MOR (psi) | (after 2 hrs. boiling) | 2050 | 1810 |

The powdered binders of these examples are excellently suited for making waferboard. The binder has good shelf-life, softens and flows at conventional board making temperatures and pressures, and gives good physical properties to the resulting waferboard.

We claim:

1. Method of preparing a heat-softenable and fast-curing phenol-formaldehyde resin in particulate form suitable for use in the production of waferboard comprising:
   (a) reacting together in an aqueous medium, phenol and formaldehyde, in a ratio of one mole of phenol to between 2.0 and 3.3 moles of formaldehyde in the presence of between 0.25 and 0.6 mole of an alkaline catalyst by heating the reactants with agitation at an elevated temperature, and continuing this reaction until a prepolymer of a resole resin having a viscosity of from 70-150 Centipoises at 80° C. is formed and cooling the prepolymer to from about 20° to 25° C.;
   (b) reacting together in an aqueous medium, phenol and formaldehyde, in a ratio of one mole of phenol to between 0.7 and 0.9 mole of formaldehyde in the presence of an acidic catalyst at an elevated temperature to form a prepolymer of a novolac resin and then cooling the reaction mixture to from 65°-70° C.;
   (c) mixing the phenol-formaldehyde resin prepolymer of (a) with the phenol-formaldehyde resin prepolymer of (b) to form a dark, homogeneous solution, the proportion, by volume, of prepolymer (a) and prepolymer (b) being from 40:60 to 60:40;
   (d) cooling the mixture to from 20° to 25° C. and spray-drying the solution of phenol-formaldehyde resins thus provided through a pressure-nozzle into a heated gas and chilling the spray-dried, particulate form of the resulting resin to form a powdered resin that softens at from 85°-100° C. and has a hot plate cure of from 10-25 seconds at 150° C. platen temperature.

2. Method of claim 1 wherein the phenol for (a) and (b) is technical grade containing not more than 15% ortho-cresol plus xylenols.

3. Method of claim 1 wherein the phenol for (a) and (b) is pure phenol.

4. Method of claim 1 wherein the formaldehyde for (a) and (b) is an aqueous solution of formaldehyde.

5. Method of claim 1 wherein the phenol of (a) and (b) is partly replaced with cresols having para and meta-cresol content.

6. Method of preparing a heat-softenable and fast-curing phenol-formaldehyde resin in particulate form suitable for use in the production of waferboard comprising:
   (a) reacting together in an aqueous medium, phenol and formaldehyde, in a ratio of one mole of phenol to between 2.6 and 2.7 moles of formaldehyde in the presence of between 0.38 and 0.4 mole of an alkaline catalyst by heating the reactants with agitation at an elevated temperature, and continuing this reaction until a prepolymer of a resole resin having a viscosity of from 70-150 centipoises at 80° C. is formed and cooling the prepolymer to from about 20° to 25° C.;
   (b) reacting together in an aqueous medium, phenol and formaldehyde, in a ratio of one mole of phenol to between 0.8 and 0.85 mole of formaldehyde in the presence of an acidic catalyst at an elevated temperature to form a prepolymer of a novolac resin and then cooling the reaction mixture to from 65°-70° C.;
   (c) mixing the phenol-formaldehyde resin prepolymer of (a) with the phenol-formaldehyde resin prepolymer of (b) to form a dark, homogeneous solution, the proportion, by volume, of prepolymer (a) and prepolymer (b) being from 40:60 to 60:40;
   (d) cooling the mixture to from 20° to 25° C. and spray-drying the solution of phenol-formaldehyde resins thus provided through a pressure-nozzle into a heated gas and chilling the spray-dried, particulate form of the resulting resin to form a powdered resin that softens at from 85°-100° C. and has a hot plate cure of from 10-25 seconds at 150° C. platen temperature.

7. Method of claim 6 wherein the phenol of (a) and (b) is technical grade containing not more than 15% orthocresol plus xylenols.

8. Method of claim 6 wherein the phenol for (a) and (b) is pure phenol.

9. Method of claim 6 wherein the formaldehyde for (a) and (b) is an aqueous solution of formaldehyde.

10. Method of claim 6 wherein the phenol of (a) and (b) is partly replaced with cresols having para and meta-cresol content.

11. A product of the method of claim 1 which is a particulate solid obtained by spray-drying an aqueous mixture obtained by reacting together phenol and formaldehyde in a ratio of one mole of phenol to between 2.0 and 3.3 moles of formaldehyde in the presence of between 0.25 and 0.6 mole of a basic catalyst and then mixing the resulting resin with a resin obtained by reacting together in an aqueous medium, phenol and formaldehyde in a ratio of one mole of phenol to between 0.7 and 0.9 mole of formaldehyde in the presence of an acidic catalyst.

12. A product of the method of claim 6 which is a particulate solid obtained by spray-drying an aqueous mixture obtained by reacting together phenol and formaldehyde in a ratio of one mole of phenol to between 2.6 and 2.7 moles of formaldehyde in the presence of between 0.38 and 0.4 mole of a basic catalyst and then mixing the resulting resin with a resin obtained by reacting together in an aqueous medium, phenol and formaldehyde, in a ratio of one mole of phenol to between 0.8 and 0.85 mole of formaldehyde in the presence of an acidic catalyst.

* * * * *

UNITED STATES PATENT AND TRADEMARK OFFICE
CERTIFICATE OF CORRECTION

PATENT NO. : 4,424,300

DATED : January 3, 1984

INVENTOR(S) : Otto G. UDVARDY, Patricia E. TITUS, and Martin NAVRATIL

It is certified that error appears in the above—identified patent and that said Letters Patent is hereby corrected as shown below:

Cover page, line [73] Assignee; "Borden, Inc., Columbus, Ohio" should be: The Borden Company Limited, Toronto, Ontario, Canada Signed and Sealed this Seventh Day of August 1984

[SEAL]

Attest:

Attesting Officer

GERALD J. MOSSINGHOFF

Commissioner of Patents and Trademarks